July 1, 1952 R. PROSKAUER 2,602,161
MODULATION SYSTEM FOR CRAFT GUIDANCE
Filed Jan. 25, 1947 2 SHEETS—SHEET 1
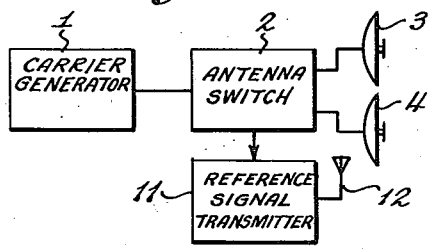
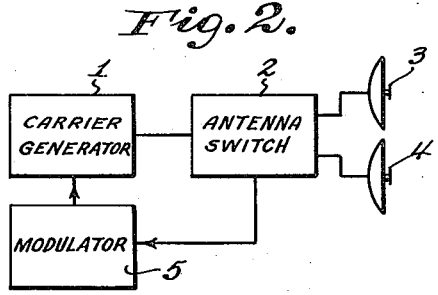
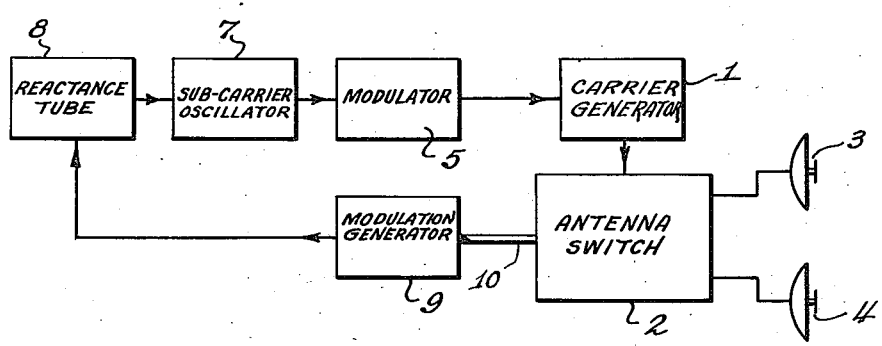
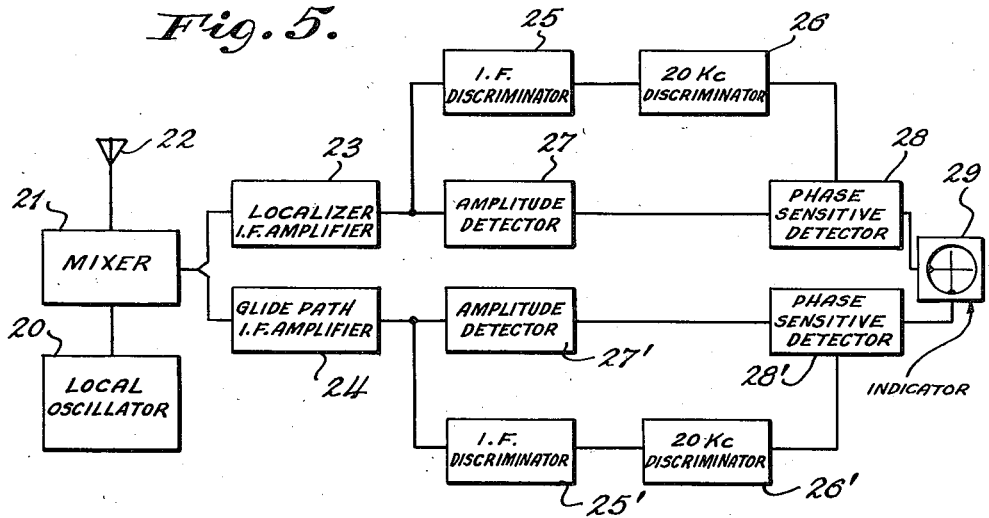
INVENTOR.
RICHARD PROSKAUER
BY
ATTORNEY July 1, 1952  R. PROSKAUER  2,602,161
MODULATION SYSTEM FOR CRAFT GUIDANCE
Filed Jan. 25, 1947  2 SHEETS—SHEET 2

INVENTOR.
RICHARD PROSKAUER
BY
ATTORNEY

Patented July 1, 1952

2,602,161

UNITED STATES PATENT OFFICE 2,602,161

MODULATION SYSTEM FOR CRAFT GUIDANCE

Richard Proskauer, Westbury, N. Y., assignor to The Sperry Corporation, a corporation of Delaware Application January 25, 1947, Serial No. 724,383

12 Claims. (Cl. 343—107)

The present invention relates to means for distinguishing separate transmissions of radiant energy including means to compare the intensities of the identified transmissions.

The invention comprises a system of modulation and demodulation by which separate transmissions, which are distinguishable in a respect other than intensity, may be readily identified. Such a system has many applications, such as in radio telemetering equipment wherein data is transmitted as the ratio of signal intensities, or in aircraft guidance systems of the type employing a plurality of beams defining a path. For purposes of illustration, the modulation and demodulation system of the invention will be described as adapted for use with such an aircraft guidance system.

In existing aircraft guidance systems of the type defining a desired course for the craft, the transmitted energy is divided among a plurality of directive radiation patterns or beams which overlap in space, each overlap region containing a zone of equal field intensities of two or more directive patterns. The transmission of each pattern is generally modulated in a manner which makes it possible to distinguish the reception of energy transmitted in one beam from that transmitted in another beam, and to determine from which directive beam the energy of greater amplitude is received. In such systems, a receiver is carried by each craft which is to be navigated in reliance upon the spatial distribution of the directive beam energy. The craft position relative to the directive beams may be indicated or automatically controlled by means suitably coupled to the receiver output.

Existing instrument-landing systems generally employ both a glide-path transmitter and a localizer, or "left-right," transmitter. Each of these transmitters emits divergent, over-lapping beams, each having a rather sharp directivity, and each beam being characteristically amplitude modulated by different audio frequencies. Glide-path and localizer transmitters may be interchangeable with the exception that the antennas have different directional characteristics.

The use of frequency-selective filters and rectifiers operating a galvanometer, according to the relative strengths of signals received from two beams of radiant energy, each modulated at different audio frequencies as illustrated in U. S. Reissue Pat. No. 22,484 in the names of W. T. Cooke et al., and has been almost universally adopted for visual-indication radio navigation systems.

Each of the audio filters employed in the receiver of such a system is characterized by a percent transmission which is a function of frequency. Each filter so employed has a large percent transmission for one of the modulation frequencies and so discriminates in its favor by selectively diminishing the output intensity of the other frequency. The selective filters must be so designed that any possible alteration in the supposedly constant modulation frequencies at the transmitter will not alter the relative transmission of each filter for the signal which it is intended to pass and that signal or those signals which it is intended to reject.

In the transmitters of existing systems, audio amplitude modulation is ordinarily afforded by a subtractive modulator, so that the beam modulation usually is provided at some sacrifice of the generated power.

The present invention presents a novel means of identifying and of comparing the intensity of the beams, by providing a separate beam-identification reference voltage, and by avoiding the use of separate filter channels.

Accordingly, a principal object of the invention is to provide new and improved means for modulating and demodulating transmissions of radiant energy, thereby to identify the transmissions.

Another object of the invention is to provide means for the identification and intensity comparison of craft guidance radio beams by which these operations may be performed substantially independently of each other by avoiding the use of frequency selective filters.

Another object of the invention is to provide a simple, reliable system and apparatus for the identification of the directive beams and for providing a measure of the position of a craft relative to a course defined by the beams.

Another object of the present invention is to provide an improved modulation system for accurate and efficient indication or control of craft position relative to a pair of radio beams.

More specifically, it is an object of the present invention to provide a simple modulation means for craft guidance systems characterized by efficient use of generated radio-frequency energy and by freedom from close tolerance requirements of the modulation frequency.

The invention also relates to the novel features or principles of the instrumentalities described herein, whether or not such are used for the stated objects, or in the stated fields or combinations.

Other objects and advantages will be apparent from the following description illustrative of the figures wherein:

Fig. 1 is a schematic diagram of one embodiment of the transmitting means;

Fig. 2 is a schematic block diagram of a second embodiment of the transmitting means;

Fig. 4 is a schematic block diagram of a third embodiment of the transmitting means;

Fig. 5 is a schematic block diagram of an embodiment of a receiver;

Figure 7:
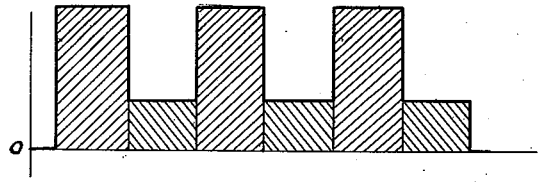
Figure 8:
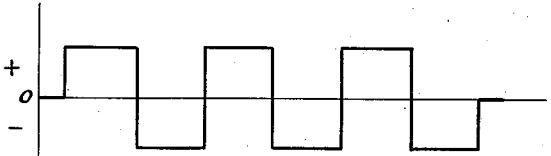
Figure 9:
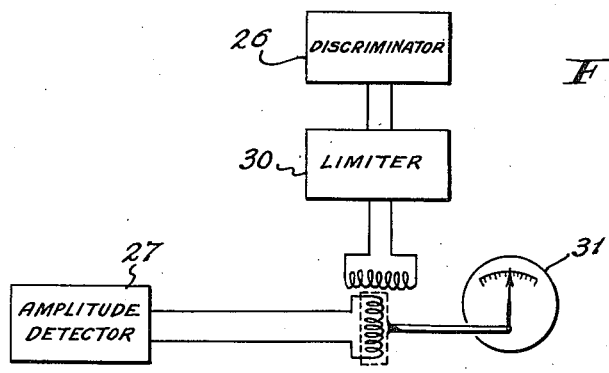

Figs. 6, 7, 8 and 10 contain wave forms illustrative of the receiver of Fig. 5; and Fig. 9 is a schematic block diagram of an equisignal indicator.

Figure 3:
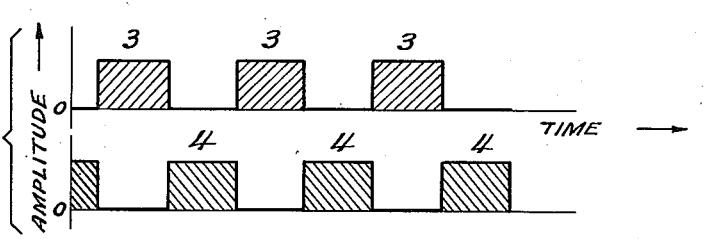
Fig. 3 shows wave forms illustrative of the operation of the transmitters of Figs. 1, 2 and 4.

Fig. 1 illustrates transmitting means which may be adapted for use either as a glide path or a localizer transmitter. It comprises a radiant energy carrier generator 1, connected to an antenna switch 2, which alternately connects the carrier generator 1 output to antennas 3 and 4, thus providing two alternating beams of energy, each beam amplitude having substantially a square wave envelope, the second beam being the inverse of the first beam, as illustrated in Fig. 3.

In order that these two beams may be identified at the receiving location, an identification reference signal is provided by modulating a separate reference signal transmitter 11 and the antenna 12 of carrier frequency different from carrier generator 1 in synchronism with the antenna switching. The identification reference signal is a wave having one polarity when antenna 3 is connected to the carrier generator 1 and the opposite polarity when antenna 4 is connected to the carrier generator 1.

In certain applications it may be convenient to do away with the separate reference signal transmitter 11 and transmit the reference signal by modulating the separate transmissions whose intensity it is desired to compare.

Fig. 2 discloses such a transmitting means which is similar to that of Fig. 1 but which does not have a separate reference signal transmitter. The reference signal, for example, may be transmitted as frequency-modulation of generator 1 by means of modulator 5 in synchronism with the switching action of antenna switch 2. This carrier shift frequency modulation will provide a suitable modulation envelope which may be detected at the receiving location and utilized as an identification reference signal.

Fig. 4 illustrates a transmitter wherein the identification reference voltage modulation is provided by frequency modulation of a subcarrier modulation. In this embodiment of the invention the central carrier frequency is modulated by a subcarrier, which in turn is modulated by the identification reference signal in synchronism with the antenna switching.

This embodiment comprises a carrier generator 1 which is adapted to be modulated by modulator 5 and is also connected to antenna switch 2 which alternately connects the generator output to antennas 3 and 4. The subcarrier modulation frequency is provided by subcarrier oscillator 7 which has a convenient frequency which may be, for example, 20 kc. The subcarrier oscillator 7 is adapted to be frequency modulated by reactance tube 8 in synchronism with the antenna switching, by means of a permanent magnet alternating current generator 9 which is mechanically connected to the antenna switch 2 by shaft 10. Generator 9 provides a signal of one polarity to the reactance tube 8 when antenna 3 is connected to the power generator 1 and a signal of the opposite polarity when antenna 4 is connected, thereby shifting the impedance of reactance tube 8 and the frequency of the subcarrier in synchronism with the antenna switching. This reference signal modulation which may be a sine wave, is detected at the receiver where it may be used as a phase reference voltage directly, or after conversion to a square wave.

Thus, it is seen that the transmitter provides two alternating beams of energy and an identification reference voltage modulation such that the two beams may be distinguished at the receiver.

The system receiver is shown in Fig. 5 which illustrates a double receiver of the required type, that is one which is adapted to receive transmissions from both a localizer, and a glide path transmitter, of the type illustrated in Fig. 4 which have different frequencies within the pass band of the receiver. The transmissions are received on antenna 22 and herterodyned in mixer 21 with the output of local oscillator 20 thereby producing a glide path I. F. and a localizer I. F., which are separately amplified in I. F. amplifiers 23 and 24.

Each I. F. amplifier output is connected to two demodulators, one a detector to measure the amplitude of the combined R. F. envelope from both beams, and the other a frequency discriminator to produce the identification reference voltage, from the identification reference modulation.

Referring to the output of the I. F. amplifier 23, amplitude responsive detector 27, connected thereto, is adapted to produce the combined amplitude envelope of both received beam signals. The combined beam signal input voltage to detector 27 is of the form of Fig. 6, if the craft is on the desired path; that is, receiving equally both beams from antennas 3 and 4 or of the form of Fig. 7 if the energy from antenna 3 is being received more strongly than the energy from antenna 4. Fig. 8 shows the output of detector 27 under the circumstance of Fig. 7.

Figure 10:
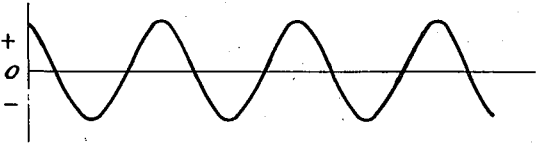

The identification reference voltage is produced by the I. F. discriminator 25 and the 20 kc. discriminator 26. The I. F. discriminator 25 demodulates the I. F. voltage and provides a 20 kc. signal frequency modulated in synchronism with the antenna switching in the transmitter of Fig. 4. The output voltage of discriminator 26 is of the wave form of Fig. 10; that is, a symmetrical wave in synchronism with the antenna switching frequency. This identification reference output voltage of discriminator 26 is not restricted to a sine wave, as shown in Fig. 10, but its form depends on the method of transmitter modulation.

These two detector output voltages, that is, the amplitude envelope of the received signals from detector 27 and the identification reference voltage from the 20 kc. discriminator 26, are combined in the phase sensitive detector 28 which may be of the double-rectifier type, which is well known.

The function of the phase sensitive detector 28 is to provide a D. C. signal voltage, the polarity of which depends on the sense of, and the magnitude of which is proportional to the magnitude of, the deviation of the craft from the path defined by the beams. The amplitude of the output voltage of the phase sensitive detector 28 must be independent of changes in amplitude of the reference signal voltage, and directly proportional to changes in amplitude of beam signal voltage. This D. C. signal voltage is then applied to a D. C., zero center indicating meter 29. Therefore, one pointer of the cross pointer meter 29 is deflected in one direction if the reception of energy from antenna 3 is stronger and in the opposite direction when the reception of energy from antenna 4 is stronger. The direction and magnitude of the craft position relative to the path defined by the two beams is thereby indicated.

The output signal voltages of glide path I. F. amplifier 24 are coupled through I. F. discriminator 25' to the 20 kc. discriminator 26' and through detector 27' to the phase detector 28'. The operations of these circuits is the same as described above, thereby energizing the other pointer of cross pointer meter 29 in the direction of the glide path beam affording the greater reception. Different subcarrier frequencies may be utilized in the glide path and localized frequencies.

This receiver is responsive to the transmitter of Fig. 4 which is adapted to transmit a carrier which is frequency modulated by a frequency modulated subcarrier. To demodulate the identification reference voltage of the simple carrier shift transmitter of Fig. 2 would not require the 20 kc. discriminator 26 but only the I. F. discriminator 25.

The method of reference signal modulation is not limited entirely to frequency modulation; for instance, frequency modulation of an amplitude modulated subcarrier would be quite adequate. The signals used to energize the cross pointer meter 29 may also be used to actuate an automatic pilot for automatic craft guidance. Thus, it is seen that the receiver is required to receive both beams, separate out the identification reference voltage and using it as a phase reference, compare the intensities of the two beams. A frequency discriminator serves to detect the identification reference voltage, and an amplitude detector serves to obtain the beam intensity envelope.

Figure 6:
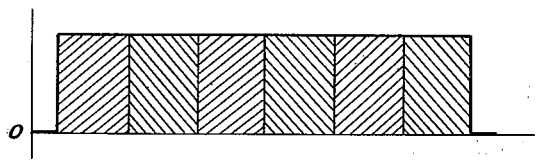

The received beam intensity envelope, which is preferably a square wave, reverses polarity whenever that one of the two received beams which was the stronger becomes the weaker, as explained in connection with Figs. 6, 7 and 8. This square wave is an input to the phase sensitive detector whose reference phase is the identification reference voltage. The output of the phase sensitive detector is a D. C. voltage whose polarity indicates which of the two beams is the stronger and the magnitude of which indicates the magnitude of the beam inequality.

Fig. 9 shows an alternative indicating means, which dispenses with the phase sensitive detector 28, wherein the outputs from the amplitude envelope detector 27 and of the beam identifying reference voltage discriminator 26 may each be fed to one winding of a zero center wattmeter indicator 31 serving in the manner of a left-right indicator.

These two A. C. signals being of the same frequency and being either in phase or in inverse phase with each other, the wattmeter will be deflected in a direction dependent only upon which of the two transmitted beams is producing greater amplitude from the amplitude detector 27. The deflection of the wattmeter pointer will therefore be proportional to the difference in voltage between these two portions of the amplitude envelope, provided only that the identification reference signal produced by discriminator 26 has been limited to a constant amplitude by limiter 30.

Thus it is seen that the received responses from both beams are handled by one and the same channel, there being no separation as in existing systems. The received signals from the two beams do not differ in a respect which can result in their differential amplification by this channel. This precludes the possibility, ever-present in existing systems, that a difference in gain experienced by the two signals, whose level is to be compared, will result in a spurious course shift. The beams may be formed by alternately switching the same transmitting source from one antenna to the other and therefore the intensities of the transmitted beams are equal. The identification reference voltage may be provided by modulating the transmitting source in synchronism with the antenna switching, or by synchronous modulation of an additional transmitter.

Three methods by which this identification reference voltage modulation may be provided are as follows:

1. By shifting the carrier frequency of the transmitting source in synchronism with the antenna switching.

2. By frequency or phase modulation of a subcarrier modulation in synchronism with the antenna switching, thus enabling the same carrier frequency to be used at all times.

3. By amplitude or frequency modulation of a separate transmitter.

The purpose of this modulation is ultimately to provide a beam identification reference voltage in the receiver. If the transmitting source is alternately connected to two antennas the identification reference voltage required in the receiver demodulator will be a voltage having one polarity when one antenna beam is received and the opposite polarity when the other antenna beam is received.

At the receiving location, the beam signals are received, the identification reference voltage modulation is detected, and its envelope fed, together with the received beam signals, to a phase-sensitive detector, the output of which consists of a signal whose polarity depends on which of the two received beam signals is the stronger and the magnitude of which is substantially proportional to the difference in their intensities.

This method avoids difficulties inherent in the prior art and utilizes the equipment more fully, resulting in the following advantages:

1. In the receiver, the signals from different beams are amplified by the same channel and are not separated before their intensity is compared, thus avoiding the possibility of their being unequally amplified.

2. Full power output of the transmitter need not be impaired by subtractive modulating means.

3. Because the transmission is not subtractively modulated, it may be employed to carry intelligence signals additional to the instrument landing signals.

It is to be understood that the invention is not limited to a modulation system for craft guidance but may be used wherever it is desired to distinguish the relative intensity of successively received signals and of distinguishing in a discrete manner between categories of signals, which differ from one another in a measurable respect other than intensity, which respect does not significantly affect the sensitivity of the means employed for measuring the relative intensity of the successively received signals.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a craft guidance system, means to generate radiant energy, a plurality of radiators, switching means adapted to alternately connect said radiators to said generating means, means to modulate said antenna transmissions with an identification reference signal including means to frequency-modulate the carrier transmission frequency with a subcarrier, and means to frequency-modulate said subcarrier in synchronism with said antenna switching means.

2. In a radio craft-guidance system, a transmitter adapted to emit at least two pulsed directional characteristically frequency-modulated beams of radio energy, a receiver including frequency modulation detecting means responsive to said beam modulations, amplitude detecting means responsive to said beams, phase comparison means responsive to said two detecting means to identify said beams and indicating means responsive to said comparison means to indicate the receiver position relative to said beams.

3. In a radio position defining system, means to define a desired path by means of radio beams modulated with an identification reference voltage, receiving means responsive to said beams and to said identification reference voltage to thereby indicate the position of said receiving means relative to said path, said receiving means including a detector and a discriminator in parallel.

4. Means to generate separate beams of radiant energy, means to modulate said beams with an identification reference voltage, a receiver comprising in combination detecting means responsive to the intensity of said generated energy detecting means responsive to said identification reference voltage, means responsive to both detecting means to compare the intensity of said separate beams and indicating means responsive to said comparison means to thereby indicate the location of said receiving means relative to said generating means.

5. Radiant energy receiving means comprising a pair of frequency discriminators in series, amplitude-responsive means in parallel with said frequency-discriminators, phase-sensitive means responsive to both said frequency-responsive means and said amplitude-responsive means, and indicating means responsive to said phase-sensitive means.

6. Radiant energy receiving means comprising in combination carrier frequency-responsive means, sub-carrier frequency responsive means connected to the output of said carrier frequency-responsive means, amplitude-responsive means, phase-sensitive means responsive to said subcarrier frequency-responsive means and said amplitude-responsive means, and indicating means responsive to said phase-sensitive means.

7. In a craft guidance system, means to generate radiant energy, a plurality of radiators, switching means adapted to alternately connect said radiators to said generating means, and means to modulate said generated energy with an identification reference voltage in synchronism with said antenna switching means, and receiving means including detector means responsive to said identification reference modulation and detector means responsive to the intensity of said energy.

8. A craft instrument landing receiver responsive to two sets of characteristically frequency modulated radio beams, comprising means to distinguish between said sets of radio beams, means to detect said beam intensities, frequency responsive means to detect a beam reference signal, phase sensitive means to compare the intensities of said beams relative to said reference signal, to thereby define the position of said receiver relative to said beams.

9. In a radio position defining system, means for transmitting energy alternately in first and second radiation directivity patterns, the transmission of energy in said first pattern being characterized by a frequency different from that of said second pattern, and radio receiving means including frequency detecting means and amplitude detecting means responsive to said directivity patterns, and comparison means responsive to both said detecting means to thereby define the position of said receiving means relative to said transmitting means.

10. The method of modulating separate energy transmissions whereby the identification and intensity comparison of said transmissions may be made substantially independently of each other, comprising generating radiant energy frequency modulated by a subcarrier, periodically switching said energy into separate beams, and modulating said subcarrier in synchronism with said switching.

11. Receiving means including, means to compare alternately pulsed overlapping beam signals relative to a first amplitude characteristic, and frequency detector means, substantially insensitive to said first characteristic, to distinguish said discrete categories of signals with reference to a second characteristic.

12. In a radio craft guidance system, means to transmit alternate pulses of radio energy in overlapping beam patterns, means to transmit an identification reference signal synchronized with said pulses, craft means to receive said alternately-pulsed overlapping beams, means connected to said receiving means to detect the combined pulse envelope of said received beams, identification means to receive said reference signal, and means responsive to said detector and said identification means to compare in phase the detected combined pulse envelope and the separately received identification signals to thereby determine the craft position relative to the overlapping beam patterns.

RICHARD PROSKAUER.

(References on following page)

REFERENCES CITED

The following references are of record in the file of this patent:

UNITED STATES PATENTS

| Number | Name | Date |
|---|---|---|
| 2,116,667 | Chireix | May 10, 1938 |
| 2,204,438 | Neufeld | June 11, 1940 |
| 2,208,921 | Busignies | July 23, 1940 |
| 2,241,897 | Alford | May 13, 1941 |
| 2,255,741 | Kramar | Sept. 9, 1941 |
| 2,258,006 | Eggers | Oct. 7, 1941 |
| 2,267,211 | Nass | Dec. 23, 1941 |
| 2,283,054 | Gossel | May 12, 1942 |
| 2,288,196 | Kramar | June 30, 1942 |
| 2,288,815 | Luck | July 7, 1942 |
| 2,344,070 | Williams | Mar. 14, 1944 |
| 2,368,318 | Muller | Jan. 30, 1945 |
| 2,377,902 | Relson | June 12, 1945 |
| 2,402,378 | Davies | June 18, 1946 |
| 2,412,986 | Himmel | Dec. 24, 1946 |
| 2,416,342 | Newhouse | Feb. 25, 1947 |
| 2,462,853 | Frum | Mar. 1, 1949 |
| 2,485,582 | Frum | Oct. 25, 1949 |